(12) United States Patent
Farr et al.

(10) Patent No.: US 11,733,111 B2
(45) Date of Patent: *Aug. 22, 2023

(54) FIELD CALIBRATION FOR TORSIONAL VIBRATION SENSOR

(71) Applicant: Baker Hughes Oilfield Operations LLC, Houston, TX (US)

(72) Inventors: Daniel Farr, Gardnerville, NV (US); Lysle Turnbeaugh, Gardnerville, NV (US); Trevor Cowan, Minden, NV (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/349,374

(22) Filed: Jun. 16, 2021

(65) Prior Publication Data

US 2021/0381914 A1 Dec. 9, 2021

Related U.S. Application Data

(63) Continuation of application No. 16/512,008, filed on Jul. 15, 2019, now Pat. No. 11,041,769.

(51) Int. Cl.
*G01L 3/10* (2006.01)
*G01L 25/00* (2006.01)
*G01H 1/00* (2006.01)

(52) U.S. Cl.
CPC .............. *G01L 3/10* (2013.01); *G01L 25/003* (2013.01); *G01H 1/003* (2013.01)

(58) Field of Classification Search
CPC .......... G01L 3/10; G01L 25/003; G01H 1/003
See application file for complete search history.

(56) References Cited

U.S. PATENT DOCUMENTS

| | | | |
|---|---|---|---|
| 2,634,604 A | 4/1953 | Hope | |
| 4,255,978 A | 3/1981 | Shima et al. | |
| 4,276,782 A | 7/1981 | Shima et al. | |
| 4,790,175 A * | 12/1988 | Himmelstein | G01L 25/00 73/1.15 |
| 5,033,305 A | 7/1991 | Rozelle et al. | |
| 5,038,616 A | 8/1991 | Schneider et al. | |
| 5,365,787 A | 11/1994 | Hernandez et al. | |

(Continued)

*Primary Examiner* — Max H Noori
(74) *Attorney, Agent, or Firm* — Mintz Levin Cohn Ferris Glovsky and Popeo, PC

(57) ABSTRACT

A method for calibrating an output of a torsional vibration transducer can include: providing a torsional vibration transducer proximate to a body of a shaft configured to rotate along an axis of rotation, the torsional vibration transducer configured to measure a torsional vibration of the shaft; actuating the shaft to cause rotation of the shaft; while the shaft rotates, acquiring, using the torsional vibration transducer, a plurality of zero-stress measurements of the shaft across a plurality of gaps between the torsional vibration transducer and the shaft; calculating at least one calibration coefficient using the plurality of zero-stress measurements; and calibrating the output of the torsional vibration transducer according to the at least one calibration coefficient to reduce a sensitivity of the torsional vibration transducer to changes in gap between the torsional vibration transducer and the shaft when the torsional vibration of the shaft is measured.

18 Claims, 6 Drawing Sheets

(56) References Cited

U.S. PATENT DOCUMENTS

| | | |
|---|---|---|
| 2003/0033883 A1 | 2/2003 | Chen |
| 2004/0054487 A1* | 3/2004 | Hala .................... G01R 35/005 |
| | | 702/104 |
| 2007/0038401 A1* | 2/2007 | Cripe ..................... G01L 3/105 |
| | | 702/104 |
| 2013/0291657 A1 | 11/2013 | Purekar et al. |
| 2014/0303926 A1* | 10/2014 | Sessego ................. G01P 21/00 |
| | | 702/104 |
| 2017/0030870 A1* | 2/2017 | Dual ...................... G01N 29/28 |
| 2019/0326906 A1* | 10/2019 | Camacho Cardenas .................... |
| | | H03K 17/945 |

* cited by examiner

FIELD CALIBRATION FOR TORSIONAL VIBRATION SENSOR

CROSS-REFERENCE TO RELATED APPLICATION

This application is a continuation of U.S. patent application Ser. No. 16/512,008, entitled "FIELD CALIBRATION FOR TORSIONAL VIBRATION SENSOR," filed Jul. 15, 2019, now issued as U.S. Pat. No. 11,041,769, which is hereby incorporated by reference in its entirety.

FIELD

Systems and methods of calibrating an output of a torsional vibration transducer are provided for measuring the torsional vibration of a rotating shaft.

BACKGROUND

The measurement of torsional vibration is a common practice across industries that incorporate rotating machinery such as electric motors, combustion engines, hydraulic pumps, power generation equipment, and the like. Torsional vibration, which can broadly be described as the angular vibration of an object, or the fluctuation in rotational velocity of a rotating component, can cause a variety of problems, and in some cases significant damage, in the shafts of rotating machines. These problems can include excessive wear and tear, unpleasant noise and vibrations, cracking, and component (e.g., crankshaft) failure. Thus, the measurement of torsional vibrations is highly important to detect potential damage in structures such as rotating shafts or couplings as soon as possible.

Various devices and techniques have been employed to measure torsional vibration. Commonly, a torsional vibration probe or transducer can measure shaft vibration using equidistant pulses over a single shaft revolution, during which the rotating shaft can be subjected to varying levels of stress resulting from the vibrations to be measured, capable of significantly limiting the working life of the shaft due to material fatigue. The pulses can be converted into a digital RPM reading or a voltage proportional to the RPM to reveal the torsional stress on the shaft.

Accurate stress measurements are necessary to effectively address situations involving excessive vibration. Often times, however, the shaft being measured moves during rotation as a result of vibration or has physical imperfections which can cause changes in displacement or "gap" between the torsional vibration transducer and the shaft. To ensure accuracy, an output (i.e., signal) of the transducer can be calibrated to compensate for the transducer-to-shaft gap variations, as these variations can affect components of the transducer signal (e.g., gain/scale and offset). While the transducer signal can be calibrated by conducting independent or external stress measurements as a reference, such a manner of calibration is inconvenient and usually unfeasible as it must be performed prior to each instance of field measurement, typically in a factory or lab setting, significantly increasing the time required to evaluate a given structure.

Accordingly, there remains a need for improved methods and devices of calibrating the output of a torsional vibration transducer.

SUMMARY

Methods and devices are provided for calibrating an output of a torsional vibration transducer to compensate for changes in displacement or "gap" between the transducer and the shaft without the need for an independent or external stress measurement, thereby enhancing the accuracy of the transducer. In one embodiment, a torsional vibration transducer is provided proximate to a body of a shaft configured to rotate along an axis of rotation. The torsional vibration transducer can be configured to measure a torsional vibration of the shaft. In certain embodiments, the shaft can be actuated to cause rotation of the shaft. As the shaft rotates, the torsional vibration transducer can be used to acquire a plurality of zero-stress measurements of the shaft across a plurality of gaps between the torsional vibration transducer and the shaft, including at least a first zero-stress measurement at a near gap between the torsional vibration transducer and the shaft and a second zero-stress measurement at a far gap between the torsional vibration transducer and the shaft.

In certain exemplary embodiments, the plurality of zero-stress measurements of the shaft, as acquired by the torsional vibration transducer, can be used to calculate at least one calibration coefficient. An output of the torsional vibration transducer can then be calibrated according to the at least one calibration coefficient using a predefined calibration algorithm. Therefore, when the torsional vibration of the shaft is measured, the sensitivity of the torsional vibration transducer to changes in gap between the transducer and the shaft can be minimized.

In some embodiments, the plurality of zero-stress measurements can further include at least one third zero-stress measurement at an intermediate gap between the torsional vibration transducer and the shaft.

In some embodiments, the method can further include providing a plurality of torsional vibration transducers proximate to the body of the shaft. As the shaft rotates, the method can further include acquiring, using the first torsional vibration transducer, the first zero-stress measurement at the near gap between the torsional vibration transducer and the shaft; and acquiring, using the second torsional vibration transducer, the second zero-stress measurement at the far gap between the torsional vibration transducer and the shaft.

In some embodiments, the method can further include actuating the shaft to cause rotation of the shaft when stress on the shaft is approximately zero; and as the shaft rotates, acquiring, using the torsional vibration transducer, the plurality of zero-stress measurements while the stress on the shaft is approximately zero. Further, when the stress on the shaft is approximately zero during rotation of the shaft, the plurality of zero-stress measurements can correspond to electrical runout signals, respectively. Even further, the respective electrical runout signals can vary according to the gap between the torsional vibration transducer and the shaft at which the torsional vibration transducer acquires a corresponding zero-stress measurement.

In some embodiments, the method can further include actuating the shaft to cause rotation of the shaft at a predefined slow roll angular velocity.

In some embodiments, the method can further include calibrating the output of the torsional vibration transducer according to the at least one calibration coefficient while the torsional vibration transducer is located in proximity of the shaft.

In some embodiments, the method can further include selecting a particular gap for each of the plurality of zero-stress measurements; and acquiring, using the torsional vibration transducer, the plurality of zero-stress measurements at the particular gap for each of the plurality of zero-stress measurements.

In some embodiments, the method can further include calculating a gain of the torsional vibration transducer based on the at least one calibration coefficient using an equation below: $f_G(p)=k_0+k_1p+k_2p^2$, wherein p corresponds to a signal derived from one or more of the plurality of zero-stress measurements, $f_G(p)$ corresponds to a gain function of the torsional vibration transducer, and $k_0$, $k_1$, and $k_2$ correspond to the at least one calibration coefficient. The method can further include calibrating the output of the torsional vibration transducer according to $f_G(p)$. Further, the signal p can correspond to an electrical runout signal acquired by the torsional vibration transducer during rotation of the shaft when stress on the shaft is approximately zero. Even further, the signal p can vary with the gap between the torsional vibration transducer and the shaft.

In some embodiments, the calibrating of the output of the torsional vibration transducer can include calculating one or more of a gain function of the torsional vibration transducer and an offset function of the torsional vibration transducer using the at least one calibration coefficient; and calibrating the output of the torsional vibration transducer according to the one or more of the gain function of the torsional vibration transducer and the offset function of the torsional vibration transducer.

In some embodiments, the calibrating of the output of the torsional vibration transducer can include calibrating the output of the torsional vibration transducer according to an equation below: $S_{comp}=f_G(p)S+f_O(p)$, wherein $S_{comp}$ corresponds to a compensated stress signal, S corresponds to a stress signal of the shaft deriving from the plurality of zero-stress measurements, p corresponds to a signal deriving from one or more of the plurality of zero-stress measurements, $f_G(p)$ corresponds to a gain function of the torsional vibration transducer, and $f_O(p)$ corresponds to an offset function of the torsional vibration transducer. Even further, the signal p can vary with the gap between the torsional vibration transducer and the shaft.

In some embodiments, the torsional vibration transducer can be a non-contact-type torsional vibration transducer.

Furthermore, in another embodiment, a system for calibrating an output of a torsional vibration transducer can include: a torsional vibration transducer configured to measure a torsional vibration of a shaft, the torsional vibration transducer disposed proximate to a body of the shaft; and a control unit including a memory configured to store program instructions and a processor configured to perform one or more operations by executing the stored program instructions.

In certain exemplary embodiments, when the shaft is actuated so as to rotate about an axis of rotation, the torsional vibration transducer can be configured to acquire a plurality of zero-stress measurements of the shaft across a plurality of gaps between the torsional vibration transducer and the shaft, the plurality of zero-stress measurements including at least a first zero-stress measurement at a near gap between the torsional vibration transducer and the shaft and a second zero-stress measurement at a far gap between the torsional vibration transducer and the shaft. After acquisition of the plurality of zero-stress measurements, the control unit can be configured to calculate at least one calibration coefficient using the plurality of zero-stress measurements, and calibrate an output of the torsional vibration transducer according to the at least one calibration coefficient to reduce a sensitivity of the torsional vibration transducer to changes in gap between the torsional vibration transducer and the shaft when the torsional vibration of the shaft is measured.

Furthermore, in another embodiment, a first plurality of zero-stress measurements of the shaft can be acquired by the torsional vibration transducer while the shaft is static across a plurality of gaps between the torsional vibration transducer and the shaft. Then, after acquiring the plurality of zero-stress measurements while the shaft is static, the shaft can be actuated so as to cause rotation of the shaft about an axis of rotation. As the shaft rotates, the torsional vibration transducer can acquire a second plurality of zero-stress measurements of the shaft at a single gap between the torsional vibration transducer and the shaft. The first and second plurality of zero-stress measurements of the shaft, as acquired by the torsional vibration transducer, can be used to calculate at least one calibration coefficient. An output of the torsional vibration transducer can then be calibrated according to the at least one calibration coefficient using a predefined calibration algorithm. Therefore, when the torsional vibration of the shaft is measured, the sensitivity of the torsional vibration transducer to changes in gap between the transducer and the shaft can be minimized.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Accurate stress measurements of rotating machinery, such as shafts or couplings, are necessary to prevent potential damage caused by torsional vibration. Frequently, the shaft being measured moves during rotation as a result of vibration or has physical imperfections which can cause changes in displacement or "gap" between the torsional vibration transducer and the shaft. The displacement of the surface of the shaft during rotation can be referred to as runout. To ensure accuracy, the output (i.e., signal) of the transducer can be calibrated to compensate for the runout, that is, the transducer-to-shaft gap variations, as these variations can affect components of the transducer signal (e.g., gain/scale and offset). Accordingly, devices and techniques for calibrating the output of a torsional vibration transducer are provided whereby only signals derived from the transducer itself at the time of field measurement are required for calibration, obviating the need to conduct independent or external stress measurements beforehand and for each physical installation.

Embodiments of torsional vibration transducer output calibration to compensate for changes in transducer-to-shaft gap are discussed below.

Figure 1:
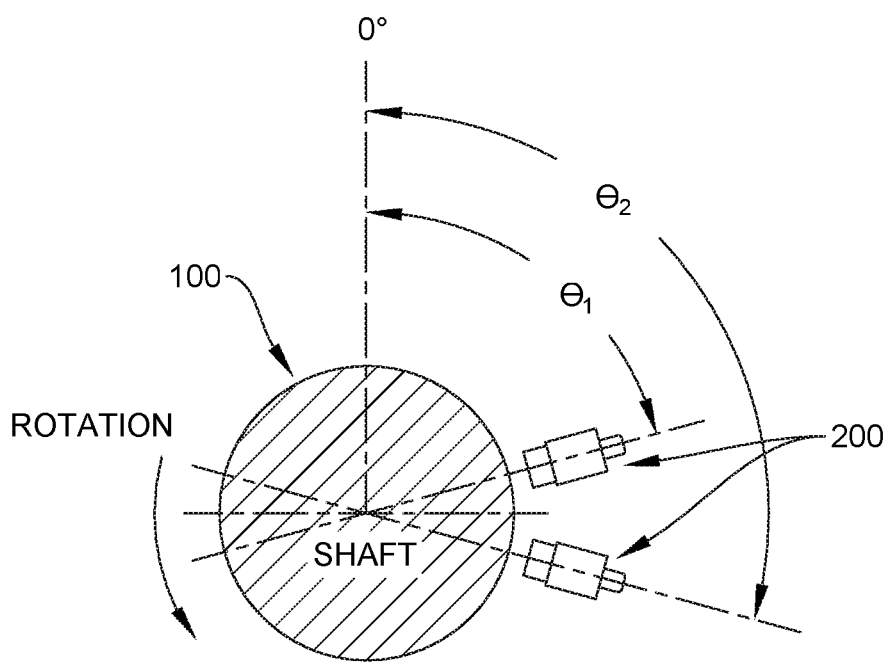
FIG. 1 is a cross-sectional view of a rotatable shaft with one or more torsional vibration transducers disposed along a circumference of the shaft.

FIG. 1 is a cross-sectional view of a rotatable shaft 100 with one or more torsional vibration transducers 200 disposed along a circumference of the shaft 100. As shown, the one or more torsional vibration transducers 200 can be positioned proximate to the body of circular shaft 100 to measure the torsional vibration of the shaft 100, which can be a rotating component within a larger machine (e.g., engine, power generation equipment, hydraulic pump, etc.). While two torsional vibration transducers 200 are shown in FIG. 1, it is to be understood that in practice any number of torsional vibration transducers can be employed to measure the torsional vibration of shaft 100. The torsional vibration transducers 200 can include any non-contact-type transducer or probe suitable for measuring the torsional vibration of a rotating body including, but not limited to, magnetorestrictive transducers, electromagnetic transducers, electrical transducers, optical transducers, laser interferometers, or the like. Similarly, the shaft 100, as described herein, is not limited solely to shafts, but can also include other rotating bodies subject to torsional vibration such as rotors, couplings, and so forth.

As is generally understood, the torsional vibration transducer 200, which is described hereinbelow in the singular for simplicity (although the present disclosure is not limited to a single transducer), can measure torsional vibration of the shaft 100 through the transmission of signals or pulses toward the shaft 100. The torsional vibration transducer can receive the reflected pulses and perform various known signal processing techniques to detect the torsional vibration (i.e., stress) on the shaft 100.

As shown in FIG. 1, a gap exists between the body of the shaft 100 and the torsional vibration transducer 200. Due to movement of the shaft 100 during rotation caused by vibration, or to imperfections in the physical structure of the shaft 100, for example, the gap between the shaft 100 and transducer 200 can change during a single shaft revolution. Problematically, the stress signal from the torsional vibration transducer 200 can be subject to undesired sensitivity to changes in the transducer-to-shaft gap.

Figure 2A:
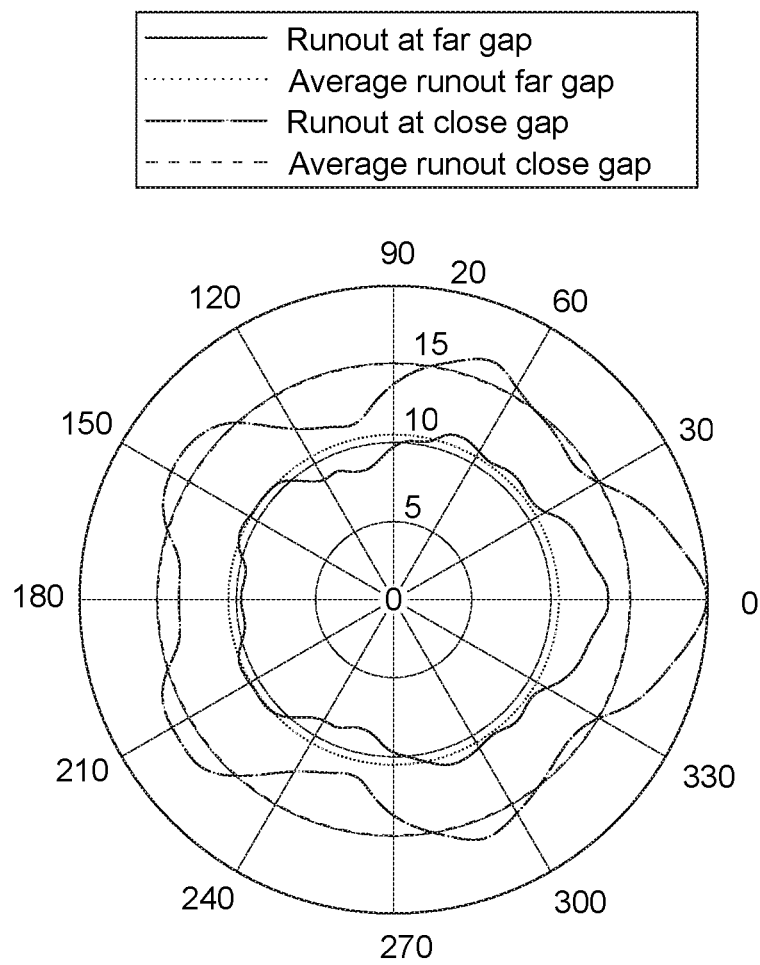
FIG. 2A is a visual representation of polar coordinates showing residual electrical runout around the shaft of FIG. 1.
Figure 2B:
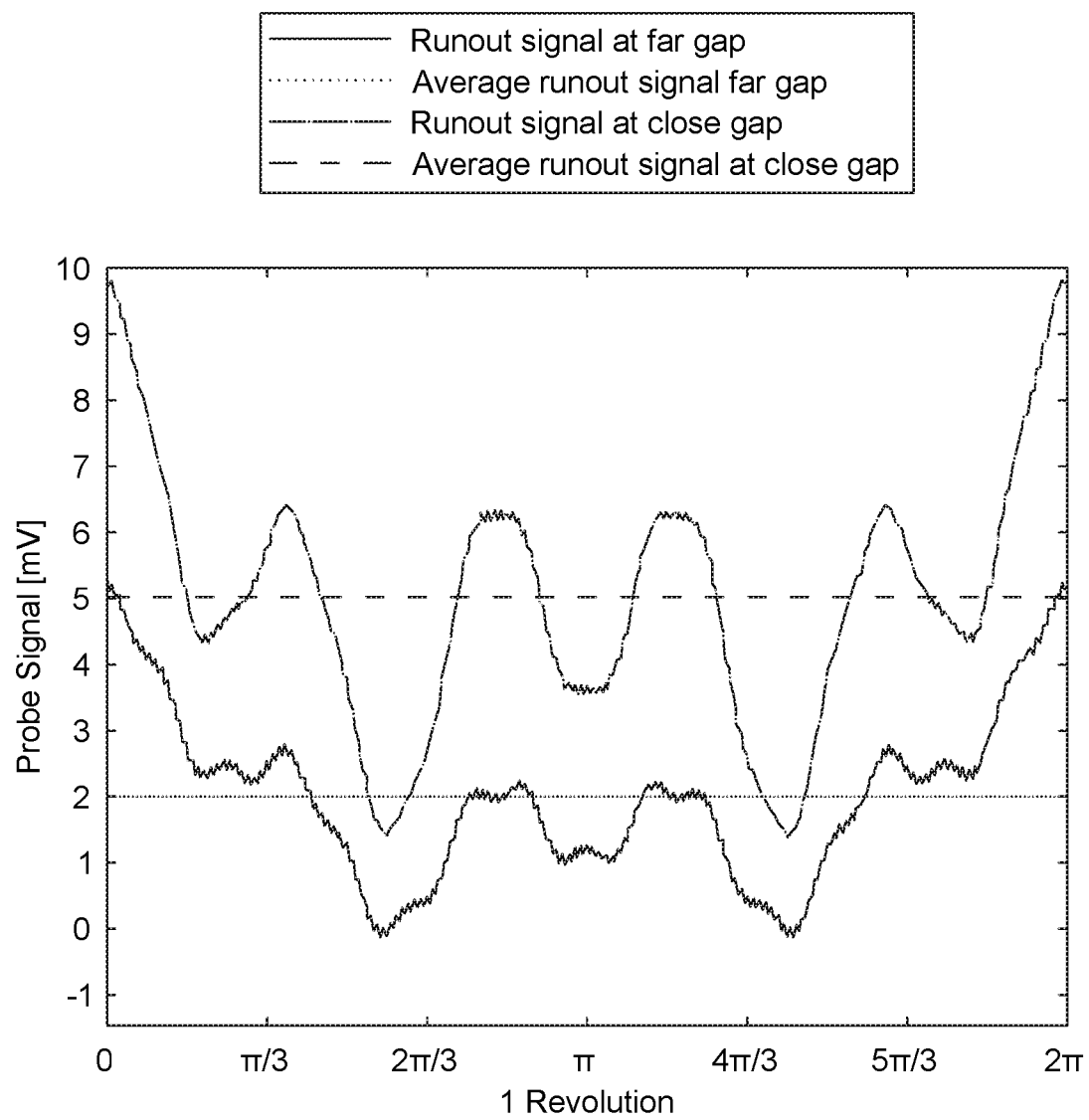
FIG. 2B is a visual representation of Cartesian coordinates showing residual electrical runout around the shaft of FIG. 1.

To illustrate, FIG. 2A is a visual representation of polar coordinates showing residual electrical runout around the shaft 100, and FIG. 2B is a visual representation of Cartesian coordinates showing residual electrical runout around the shaft 100. Typically considered an error or glitch, the electrical runout signal as measured by the torsional vibration transducer 200 can be a product of various causes, such as residual stresses from machining, non-uniform, residual magnetization of the rotating shaft 100, and the like, resulting in variable magnetic permeability of the surface. When there is zero or negligible stress (i.e., load or torque) on the shaft 100, and the transducer-to-shaft gap is kept constant, the signal read by the torsional vibration transducer 200 can be solely representative of the electrical runout. This electrical runout signal, which is measured while stress on the shaft 100 is approximately zero, can be utilized to calculate calibration coefficients for calibrating the output (i.e., signal) of the torsional vibration transducer 200, as described in greater detail below.

As shown in FIGS. 2A and 2B, the average electrical runout can change based upon the gap, that is, the distance between the torsional vibration transducer 200 and the surface of the shaft 100, at a given position on the shaft 100. Generally, the sensitivity of the signal received by the torsional vibration transducer 200 (measured in volts or millivolts (mV)) can increase as the gap decreases, i.e., the transducer 200 is closer to the shaft 100. Thus, the signal voltage at near gap (i.e., the smallest gap between shaft 100 and transducer 200) can be greater than the signal voltage at far gap (i.e., the largest gap between shaft 100 and transducer 200).

As further shown in FIGS. 2A and 2B, the runout signal at both near gap and far gap can fluctuate throughout a complete revolution of the shaft 100. These larger fluctuations can be due to the non-uniform variations of electrical runout of the shaft 100.

The sensitivity to changes in the gap between the rotating shaft 100 and the torsional vibration transducer 200 can be reduced, or removed entirely, by calibrating the output of the transducer 200 for such gap changes. To avoid inefficiencies caused by independent or external stress testing conducted prior to actual field measurements, as described above, calibration of the output of the torsional vibration transducer 200 can be performed using only the signal from the transducer 200 itself, that is, the zero-stress output of the transducer 200 as a proxy for the transducer's sensitivity to stress. For the purpose of the present disclosure, zero-stress measurements can refer to measurements during rotation of the shaft 100 when stress thereon is negligible or zero (i.e., approximately zero stress).

Figure 2C:
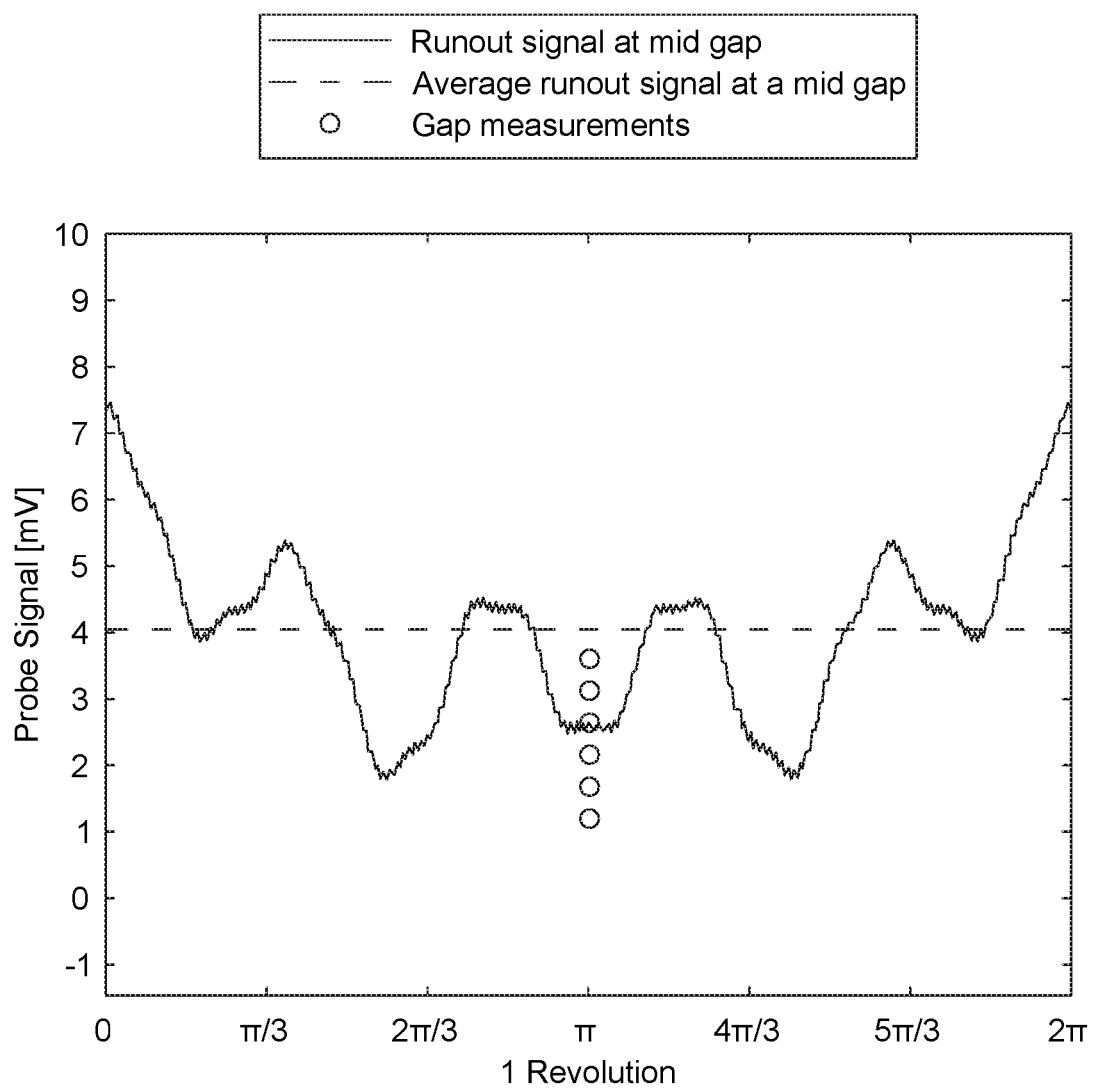
FIG. 2C is a visual representation of Cartesian coordinates showing residual electrical runout after zero-stress measurements are taken at a single, static location of the shaft of FIG. 1 while changing the gap between a torsional vibration transducer and the shaft.

Meanwhile, FIG. 2C is a visual representation of Cartesian coordinates showing residual electrical runout after zero-stress measurements are taken at a single, static location of the shaft 100 while changing the gap between the shaft 100 and the torsional vibration transducer 200. FIG. 2C will be described in detail below with reference to FIG. 4.

Figure 3:
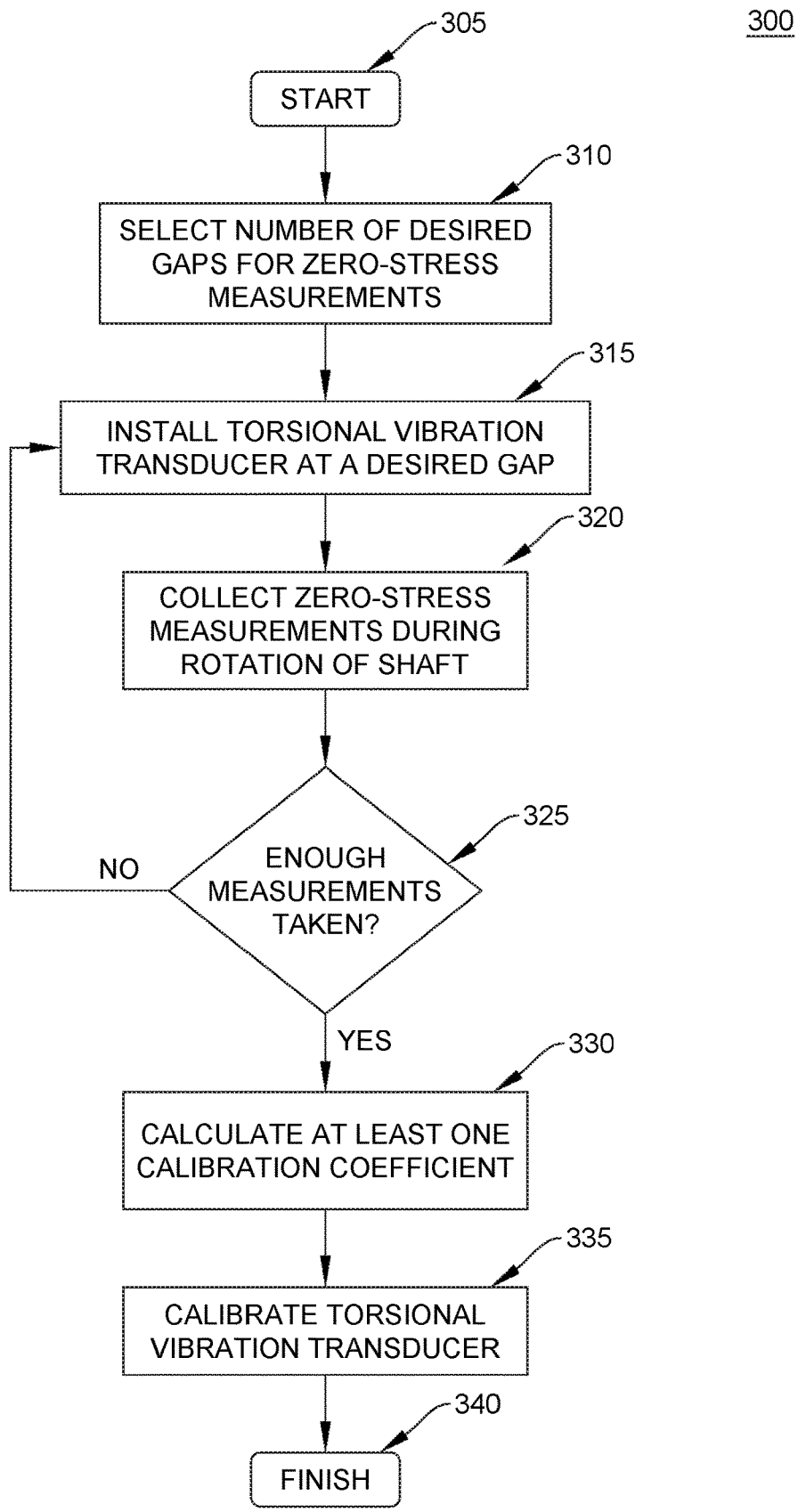
FIG. 3 is a flowchart showing a simplified, exemplary procedure for calibrating an output of a torsional vibration transducer according to a first embodiment of the present disclosure.

Operationally, FIG. 3 is a flowchart showing a simplified, exemplary procedure for calibrating an output of the torsional vibration transducer 200 according to a first embodiment of the present disclosure. The procedure 300 may start at step 305, and continue to step 310, where, as described in greater detail herein, the output of the torsional vibration transducer 200 can be calibrated to compensate for changes in transducer-to-shaft gap by collecting a plurality of zero-stress measurements of the rotating shaft 100.

At step 310, the number of desired gaps for the zero-stress measurements of the shaft 100 to be collected can be selected. Zero-stress measurements can correspond to measurements taken by the torsional vibration transducer 200 while there is approximately zero stress (i.e., no stress or negligible stress) on the shaft 100. At a given gap, the zero-stress output of the torsional vibration transducer 200 can equate solely to the electrical runout signal. The signal can serve as a proxy for the transducer's sensitivity to stress.

The zero-stress measurements of the shaft 100 can be collected across multiple gaps between the shaft 100 and the torsional vibration transducer 200. At a minimum, the zero-stress measurements can include a first zero-stress measurement at the near gap between the torsional vibration transducer 200 and the shaft 100 and a second zero-stress measurement at the far gap between the torsional vibration transducer 200 and the shaft 100. The zero-stress measurements of the shaft 100 can further include any number of zero-stress measurements collected at intermediate gaps, that is, gaps between the near and far gaps. Additionally, particular gaps can be selected for each of the zero-stress measurements. In such case, the torsional vibration transducer 200 can acquire the zero-stress measurements at the selected particular gap for each zero-stress measurement.

At step 315, the torsional vibration transducer 200 can be installed at a desired gap. Referring again to FIG. 1, one or more torsional vibration transducers 200 can be disposed proximate to the body of the shaft 100 at positions enabling each transducer 200 to collect measurements of the shaft 100. In some embodiments, each transducer 200 can be positioned with a specific gap between it and the surface of the shaft 100. For example, a first torsional vibration transducer 200 can be positioned at a predefined near gap between the first transducer 200 and the shaft 100, and a second torsional vibration transducer 200 can be positioned at a predefined far gap between the second transducer 200 and the shaft 100. It is understood, however, that any number of torsional vibration transducers 200 can be utilized. Also, each transducer 200 can be positioned at a desired angle offset, such as $\theta_1$ or $\theta_2$, from a reference angle (e.g., top dead center or 0°) of the shaft 100.

At step 320, the torsional vibration transducer 200 can acquire the zero-stress measurements of the shaft 100 during rotation of the shaft 100. To this end, the shaft 100 can be actuated so as to cause rotation of the shaft 100 about an axis of rotation, represented as a center point of the shaft 100 shown in FIG. 1. The shaft 100 can rotate while the stress on the shaft is zero or negligible (i.e., approximately zero stress), thus allowing for the acquisition of zero-stress measurements by the torsional vibration transducer 200.

Actuation of the shaft 100 can be performed, for example, by a control unit operatively coupled to the shaft 100. The direction of rotation as shown in FIG. 1 is counter-clockwise, although the shaft 100 can rotate in any direction. Furthermore, the shaft 100 can be controlled to rotate slowly, also known as a "slow roll," which can correspond to a predefined angular velocity ("slow roll angular velocity"). Accordingly, the torsional vibration transducer 200 can acquire the zero-stress measurements during the slow roll of the shaft 100, in order to enhance the accuracy of the measurements.

At step 325, it can be determined whether the torsional vibration transducer 200 has acquired a sufficient number of zero-stress measurements. For example, the number of measurements collected can be compared to the desired number of zero-stress measurements selected in step 310. If the desired number of zero-stress measurements selected in step 310 has not yet been met, the procedure 300 can return to step 315 where transducer 200 can be moved to another gap, if desired, and additional zero-stress measurements can be collected at step 320. Moreover, it can be determined whether zero-stress measurements have been collected at all desired gaps, e.g., near gap, far gap, and optionally, one or more intermediate gaps. If a zero-stress measurement has not been collected at a particular desired gap, the procedure 300 can return to step 320 where additional zero-stress measurements at said desired gap can be collected.

If enough zero-stress measurements of the shaft 100 have been collected by the torsional vibration transducer 200, the procedure 300 can continue to step 330. Here, the zero-stress data collected in step 320 can be used to calculate at least one calibration coefficient for calibrating the output of the torsional vibration transducer 200 in accordance with the physical installation being evaluated.

In some embodiments, mathematical functions $f_G$ and $f_O$ can control the gain and offset of the torsional vibration transducer 200 at a particular gap, respectively. These functions can each rely upon a set of calibration coefficients for which $f_G$ and $f_O$ will cause a calibration algorithm, described in further detail below, to have the most accurate and consistent stress sensitivity over gap, thus optimizing the performance of the torsional vibration transducer 200. Functions $f_G$ and $f_O$ can be calculated in various ways. For example, $f_G$ can be calculated as follows:

$$f_G(p)=k_0+k_1p+k_2p^2 \quad [1]$$

Here, p can represent a physical signal, such as, for example, the proximity or gap signal from the torsional vibration transducer 200 which varies with the gap between the shaft 100 and transducer 200, although p is not limited thereto. For example, the signal p can be derived from the zero-stress measurements of the shaft 100 collected by the torsional vibration transducer 200. In some embodiments, the signal p can vary linearly with the gap. Further, $k_0$, $k_1$, and $k_2$ can represent the set of calibration coefficients for calculating gain function $f_G$. Values of the gain function $f_G$ can be calculated based upon the physical signal p which is measured by the torsional vibration transducer 200 at various gaps, including both near and far gaps (e.g., $p_{near}$ and $p_{far}$), as well as any intermediate gaps, while the stress on the rotating shaft 100 is approximately zero (step 320). Meanwhile, in some embodiments, the calibration coefficients for offset function $f_O$ can be derived by setting the value of $S_{comp}$, described below, to zero. It is to be understood, however, that calculation of the at least one calibration coefficient is not limited to the specific techniques or formulae provided above.

At step 335, the at least one calibration coefficient calculated in step 330 can be utilized to calibrate an output or signal of the torsional vibration transducer 200, thus reducing or removing the sensitivity of the transducer 200 to changes in gap between the transducer 200 and the shaft 100. As explained above, calibration of the output of the torsional vibration transducer 200 can be performed in the field, that is, while the transducer 200 is located in proximity of the shaft 100 to be measured, rather than in a factory or a lab, thereby enhancing the efficiency of the transducer calibration process.

Various calibration functions, using the at least one calibration coefficient as input, can be utilized to calibrate the output of the torsional vibration transducer 200. For example, a calibration function for deriving $S_{comp}$, which represents a compensated stress signal, can be calculated as follows:

$$S_{comp}=f_G(p)S+f_O(p) \quad [2]$$

Here, S can represent a stress signal (inclusive of electrical runout) deriving from the plurality of zero-stress measurements taken by the torsional vibration transducer 200, as represented in FIGS. 2A and 2B, and p can represent a physical signal from the torsional vibration transducer 200 varying with the gap between the shaft 100 and transducer 200, as explained above. In some cases, p can represent a proximity or gap signal, although p is not limited thereto. Thus, respective signals S and p measured by the torsional vibration transducer 200 can differ from one another.

Given a certain physical situation, where S and p change in a certain way with respect to gap, there can be one set of calibration coefficients $k_0$, $k_1$, and $k_2$ for which $f_G$ will cause $S_{comp}$ to have the most accurate and consistent stress sensitivity over gap. Similarly, there can be a set of coefficients that allow $f_O$ to keep $S_{comp}$ constant while gap changes. No matter what form $f_G$ and $f_O$ take, there can be some number of calibration coefficients which, upon calculation in step 330, can optimize the final performance of $S_{comp}$.

Finally, $S_{comp}$ can be utilized to calibrate the output of the torsional vibration transducer 200 by compensating the stress signal measured by the transducer 200. It is to be understood, however, that calibration of the output of the torsional vibration transducer 200 is not limited to the specific techniques or formulae provided above.

The procedure 300 illustratively ends at step 340. The techniques by which the steps of procedure 300 may be performed, as well as ancillary procedures and parameters, are described in detail above.

It should be noted that the steps shown in FIG. 3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 4:
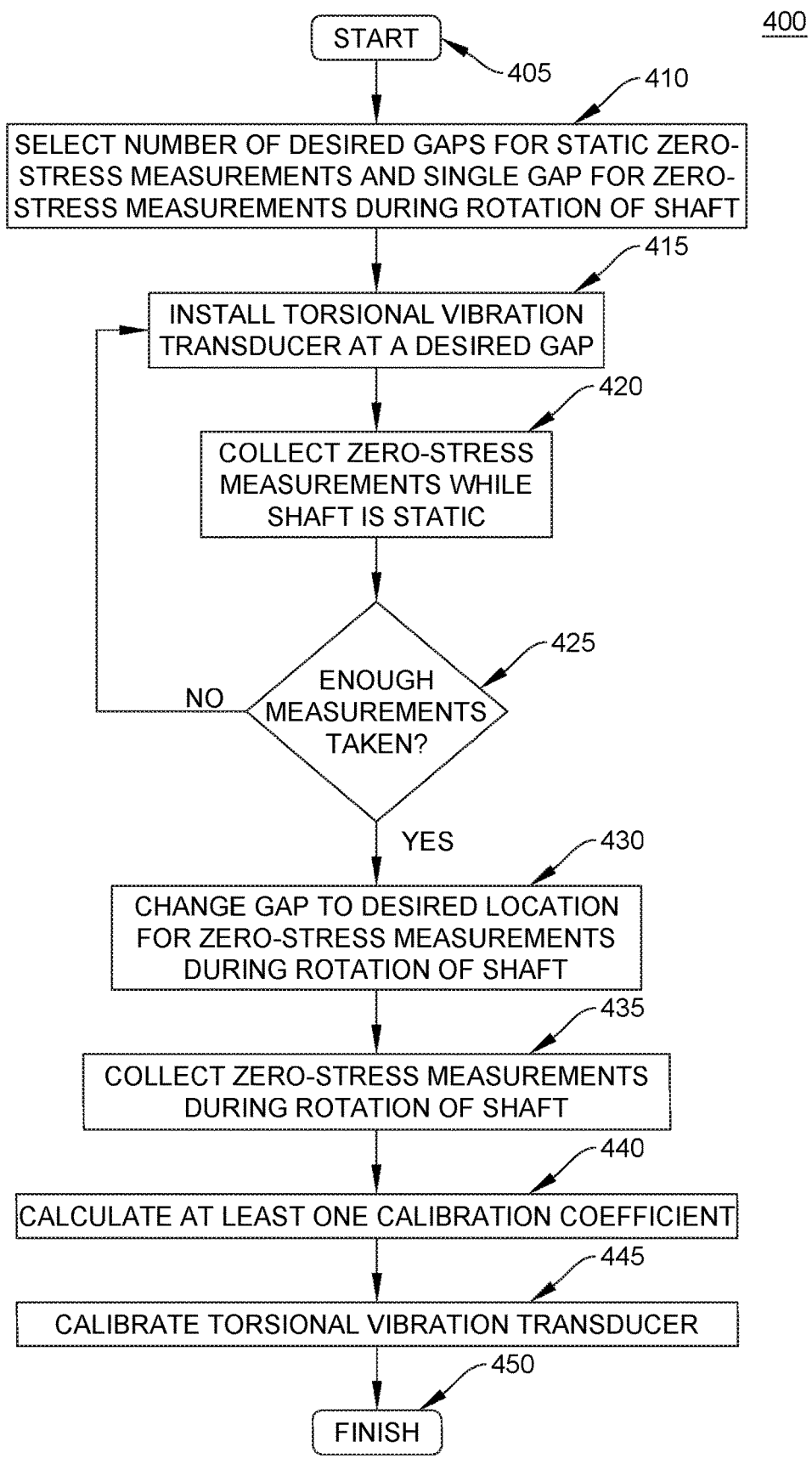
FIG. 4 is a flowchart showing a simplified, exemplary procedure for calibrating an output of a torsional vibration transducer according to a second embodiment of the present disclosure.

FIG. 4 is a flowchart showing a simplified, exemplary procedure for calibrating an output of the torsional vibration transducer 200 according to a second embodiment of the present disclosure. The procedure 400 may start at step 405, and continue to step 410, where, as described in greater detail herein, the output of the torsional vibration transducer 200 can be calibrated to compensate for changes in transducer-to-shaft gap by collecting a plurality of zero-stress measurements of the rotating shaft 100. In contrast with the procedure 300 of FIG. 3, torsional vibration transducer calibration can be performed by initially taking zero-stress measurements at a single location of the shaft 100 when the shaft 100 is static (i.e., non-rotating) while changing the gap between the shaft 100 and the torsional vibration transducer 200.

At step 410, the number of desired gaps for collecting the zero-stress measurements of the shaft 100 while the shaft 100 is static can be selected. Additionally, the desired single gap for collecting the zero-stress measurements of the shaft 100 while the shaft 100 is rotating can be selected. At step 415, the torsional vibration transducer 200 can be installed at a desired gap among the plurality of desired gaps. As explained above, one or more torsional vibration transducers 200 can be disposed proximate to the body of the shaft 100 at positions enabling each transducer 200 to collect measurements of the shaft 100. It is understood that any number of torsional vibration transducers 200 can be utilized, and likewise, that each transducer 200 can be positioned at a desired angle offset, such as $\theta_1$ or $\theta_2$, from a reference angle (e.g., top dead center or 0°) of the shaft 100

At step 420, the torsional vibration transducer 200 can acquire zero-stress measurements of the shaft 100 ("first plurality of zero-stress measurements"). Unlike step 320 of FIG. 3, however, these zero-stress measurements of the shaft 100 can be acquired by the torsional vibration transducer 200 while the shaft 100 is not rotating, that is, static. As such, the zero-stress measurements of the shaft 100 can correspond to a single location of the shaft 100. At step 425, it can be determined whether the torsional vibration transducer 200 has acquired a sufficient number of zero-stress measurements based on the desired number of the zero-stress measurements of the shaft 100 selected in step 410, for example. If the desired number of zero-stress measurements selected in step 410 has not yet been met, the procedure 400 can return to step 415 where transducer 200 can be moved to another gap, if desired, and additional zero-stress measurements can be collected at step 420.

Meanwhile, the gap between the shaft 100 and the torsional vibration transducer 200 can be changed during the acquisition of the zero-stress measurements at step 420. For example, referring to FIG. 2C, each circle on the plot represents a gap at which a zero-stress measurement of the shaft 100 can be acquired. As shown in FIG. 2C, the runout signal pattern can be affected by the change in gap at the single location of the shaft 100.

Upon evaluating the gap effect at the single location of the shaft 100 within the electrical runout pattern, the gap between the shaft 100 and torsional vibration transducer 200 can be changed to the desired gap selected at step 410 at step 430. Then, at step 435, the shaft 100 can be controlled to rotate slowly, i.e., a "slow roll," and zero-stress measurements can be acquired by the torsional vibration transducer 200 at a single gap ("second plurality of zero-stress measurements") to determine how the electrical runout changes around the shaft 100.

At step 440, the zero-stress data collected in steps 420 and 435 can be used to calculate at least one calibration coefficient for calibrating the output of the torsional vibration transducer 200 in accordance with the physical installation being evaluated. The same techniques and computations for calculating the at least one calibration coefficient described above in relation to step 330 of FIG. 3 can be applied.

The gap effect found at the single location of the static shaft 100 within the electrical runout pattern can be extrapolated to the rest of the runout pattern. These findings, in conjunction with the at least one calibration coefficient, can be utilized to calibrate the output of the torsional vibration transducer 200 at step 445. In some embodiments, the opposite process can be performed, by which electrical runout is measured as the shaft 100 rotates, and then rotation of the shaft 100 is stopped, whereupon gap measurements are acquired and extrapolated over the runout signal.

The procedure 400 illustratively ends at step 450. The techniques by which the steps of procedure 400 may be performed, as well as ancillary procedures and parameters, are described in detail above.

It should be noted that the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, the systems and methods discussed herein for calibrating an output of a torsional vibration transducer to measure the torsional vibration of a rotating shaft can be performed at the measurement site, that is, in the field, without the need for an independent stress measurement typically conducted ahead of time in the factory or lab. These field calibration techniques can save time, while simultaneously enhancing the accuracy of the transducer.

While there have been shown and described illustrative embodiments that provide for field calibration of an output of a torsional vibration transducer, it is to be understood that various other adaptations and modifications may be made within the spirit and scope of the embodiments herein. For example, the embodiments have been primarily shown and described herein with relation to rotating shafts. However, the embodiments in their broader sense are not as limited. Rather, the devices and techniques described herein may be applied to other rotating bodies subject to torsional vibration, as well. Thus, the embodiments may be modified in any suitable manner in accordance with the scope of the present claims.

It should be understood that terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "includes," or variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additionally, it is understood that one or more of the above methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described in detail above. The control unit may control operation of units, modules, parts, devices, or the like, as described herein. Moreover, it is understood that the above methods may be executed by an apparatus comprising the control unit in conjunction with one or more other components, as would be appreciated by a person of ordinary skill in the art.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for calibrating an output of a torsional vibration transducer, comprising:

receiving, by one or more processors, a plurality of zero-stress measurements of a shaft acquired by a torsional vibration transducer during rotation of the shaft about an axis of rotation and across a plurality of gaps between the torsional vibration transducer and the shaft, wherein the plurality of zero-stress measurements include at least a first zero-stress measurement at a near gap between the torsional vibration transducer and the shaft and a second zero-stress measurement at a far gap between the torsional vibration transducer and the shaft;

calculating, by the one or more processors, at least one calibration coefficient using the plurality of zero-stress measurements; and calibrating, by the one or more processors, the output of the torsional vibration transducer according to the at least one calibration coefficient to reduce a sensitivity of the torsional vibration transducer to changes in gap between the torsional vibration transducer and the shaft when a torsional vibration of the shaft is measured.

2. The method of claim 1, wherein the plurality of zero-stress measurements further includes at least one third zero-stress measurement at an intermediate gap between the torsional vibration transducer and the shaft.

3. The method of claim 1, wherein the torsional vibration transducer is a plurality of torsional vibration transducers proximate to the body of the shaft.

4. The method of claim 3, further comprising, by the one or more processors:

receiving the first zero-stress measurement acquired by a first torsional vibration transducer of the plurality of torsional vibration transducers at the near gap between the torsional vibration transducer and the shaft; and receiving the second zero-stress measurement acquired by a second torsional vibration transducer of the plurality of torsional vibration transducers at the far gap between the torsional vibration transducer and the shaft.

5. The method of claim 1, wherein the plurality of zero-stress measurements are acquired by the torsional vibration transducer during rotation of the shaft when the stress on the shaft is approximately zero.

6. The method of claim 5, wherein, when the stress on the shaft is approximately zero during rotation of the shaft, the plurality of zero-stress measurements correspond to electrical runout signals, respectively.

7. The method of claim 6, wherein the respective electrical runout signals vary according to the gap between the torsional vibration transducer and the shaft at which the torsional vibration transducer acquires a corresponding zero-stress measurement.

8. The method of claim 1, further comprising, by the one or more processors, actuating the shaft to cause rotation of the shaft at a predefined slow roll angular velocity.

9. The method of claim 1, further comprising, by the one or more processors, calibrating the output of the torsional vibration transducer according to the at least one calibration coefficient while the torsional vibration transducer is located in proximity of the shaft.

10. The method of claim 1, further comprising, by the one or more processors:

receiving a selection of a particular gap for each of the plurality of zero-stress measurements; and receiving the plurality of zero-stress measurements acquired by the torsional vibration transducer at the particular gap for each of the plurality of zero-stress measurements.

11. The method of claim 1, further comprising, by the one or more processors:

calculating a gain of the torsional vibration transducer based on the at least one calibration coefficient using an equation below:

$$f_G(p) = k_0 + k_1 p + k_2 p^2,$$

wherein p corresponds to a signal derived from one or more of the plurality of zero-stress measurements, $f_G(p)$ corresponds to a gain function of the torsional vibration transducer, and $k_0$, $k_1$, and $k_2$ correspond to the at least one calibration coefficient.

12. The method of claim 11, further comprising, by the one or more processors, calibrating the output of the torsional vibration transducer according to $f_G(p)$.

13. The method of claim 11, wherein the signal p corresponds to an electrical runout signal acquired by the torsional vibration transducer during rotation of the shaft when stress on the shaft is approximately zero.

14. The method of claim 11, wherein the signal p varies with the gap between the torsional vibration transducer and the shaft.

15. The method of claim 1, wherein the calibrating of the output of the torsional vibration transducer comprises:

calculating one or more of a gain function of the torsional vibration transducer and an offset function of the torsional vibration transducer using the at least one calibration coefficient; and calibrating the output of the torsional vibration transducer according to the one or more of the gain function of the torsional vibration transducer and the offset function of the torsional vibration transducer.

16. The method of claim 1, wherein the calibrating of the output of the torsional vibration transducer comprises:

calibrating the output of the torsional vibration transducer according to an equation below:

$$S_{comp} = f_G(p) S + f_O(p),$$

wherein $S_{comp}$ corresponds to a compensated stress signal, S corresponds to a stress signal of the shaft deriving from the plurality of zero-stress measurements, p corresponds to a signal deriving from one or more of the plurality of zero-stress measurements, $f_G(p)$ corresponds to a gain function of the torsional vibration transducer, and $f_O(p)$ corresponds to an offset function of the torsional vibration transducer.

17. The method of claim 16, wherein the signal p varies with the gap between the torsional vibration transducer and the shaft.

18. A method for calibrating an output of a torsional vibration transducer, comprising:

receiving, by one or more processors, a first plurality of zero-stress measurements of a shaft acquired by a torsional vibration transducer while the shaft is static across a plurality of gaps between the torsional vibration transducer and the shaft;

receiving, by the torsional vibration transducer, a second plurality of zero-stress measurements of the shaft acquired by the torsional vibration transducer during rotation of the shaft about an axis of rotation and at a single gap between the torsional vibration transducer and the shaft;

calculating, by the one or more processors, at least one calibration coefficient using the first and second plurality of zero-stress measurements; and calibrating, by the one or more processors, the output of the torsional vibration transducer according to the at least one calibration coefficient to reduce a sensitivity of the torsional vibration transducer to changes in gap between the torsional vibration transducer and the shaft when a torsional vibration of the shaft is measured.

* * * * *